US009196089B2

(12) United States Patent
Tena et al.

(10) Patent No.: US 9,196,089 B2
(45) Date of Patent: Nov. 24, 2015

(54) TECHNIQUES FOR PROCESSING RECONSTRUCTED THREE-DIMENSIONAL IMAGE DATA

(75) Inventors: Jose Rafael Tena, Pittsburgh, PA (US); Moshe Mahler, Pittsburgh, PA (US); Iain Matthews, Pittsburgh, PA (US); Hengchin Yeh, Chapel Hill, NC (US); Thabo Dominik Beeler, Grison (CH); Robert Sumner, Zurich (CH); Cydni Tetro, Cedar Hills, UT (US); John-Thomas C. Ngo, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 617 days.

(21) Appl. No.: 13/474,625

(22) Filed: May 17, 2012

(65) Prior Publication Data
US 2013/0307848 A1 Nov. 21, 2013

(51) Int. Cl.
*G06T 19/00* (2011.01)
*G06T 17/20* (2006.01)
*G06T 19/20* (2011.01)
*G06T 17/00* (2006.01)

(52) U.S. Cl.
CPC .................. *G06T 17/20* (2013.01); *G06T 19/20* (2013.01); *G06T 17/00* (2013.01)

(58) Field of Classification Search
CPC ......... G06T 17/20; G06T 17/00; G06T 19/20; G06T 13/20; G06T 2210/44; G06T 7/2046; G06T 13/40
USPC .................................................. 345/419–420
See application file for complete search history.

(56) References Cited

U.S. PATENT DOCUMENTS

| 4,659,319 A | 4/1987 | Blair |
| 5,314,370 A | 5/1994 | Flint |
| 6,071,171 A | 6/2000 | George et al. |
| 6,099,378 A | 8/2000 | George et al. |
| 6,244,926 B1 | 6/2001 | George et al. |
| 6,491,565 B1 | 12/2002 | McCullough |
| 6,549,819 B1 | 4/2003 | Danduran et al. |
| 7,589,720 B2 * | 9/2009 | Zhou et al. ..................... 345/423 |
| 8,243,334 B2 * | 8/2012 | Abeloe ........................... 358/2.1 |
| 8,368,712 B2 * | 2/2013 | DeRose et al. ................ 345/581 |
| 8,830,226 B2 * | 9/2014 | Goossens ...................... 345/419 |

(Continued)

OTHER PUBLICATIONS

Luebke, David P. "A developers survey of polygonal simplification algorithms." Computer Graphics and Applications, IEEE 21.3 (2001): 24-35.*

(Continued)

*Primary Examiner* — Kee M Tung
*Assistant Examiner* — Ryan M Gray
(74) *Attorney, Agent, or Firm* — Patterson & Sheridan, LLP

(57) ABSTRACT

Techniques are disclosed for creating digital assets that can be used to personalize themed products. For example, a workflow and pipeline used to generate a 3D model from digital images of a person's face and to manufacture a personalized, physical figurine customized with the 3D model are disclosed. The 3D model of the person's face may be simplified to match a topology of a desired figurine. While the topology is deformed to match that of the figurine, the 3D model retains the geometry of the child's face. Simplifying the topology of the 3D model in this manner allows the mesh to be integrated with or attached to a mesh representing desired figurine.

19 Claims, 11 Drawing Sheets

(56) References Cited

U.S. PATENT DOCUMENTS

| | | | |
|---|---|---|---|
| 2004/0157527 A1* | 8/2004 | Omar | 446/268 |
| 2006/0003111 A1* | 1/2006 | Tseng | 428/16 |
| 2009/0213131 A1* | 8/2009 | DeRose et al. | 345/581 |
| 2009/0213138 A1* | 8/2009 | DeRose et al. | 345/619 |
| 2010/0053172 A1* | 3/2010 | DeRose et al. | 345/473 |
| 2011/0175900 A1 | 7/2011 | Beeler et al. | |

OTHER PUBLICATIONS

Tena, J.R.; Harmouz, M.; Hilton, A.; Illingworth, J. "A Validated Method for Dense Non-Rigid 3D Face Registration", Video and Signal Based Surveillance, Nov. 2006. AVSS '06. IEEE International Conference on Video and Signal Based Surveillance.

* cited by examiner

TECHNIQUES FOR PROCESSING RECONSTRUCTED THREE-DIMENSIONAL IMAGE DATA

BACKGROUND

1. Field

Embodiments disclosed herein are generally directed to techniques for processing reconstructed three-dimensional (3D) image data. More specifically, embodiments disclosed herein provide approaches for integrating the reconstructed 3D image data with other 3D models.

2. Description of the Related Art

Digital cameras are used to capture images that can be manipulated using specialized computer software and hardware. For example, computer graphics applications are able to create sophisticated 3D models from camera images. And such 3D models are used extensively by the animation, movie and the video game industries. These industries frequently create recognizable brands around characters, stories, or elements of a given media property—e.g., a character from a movie or video game or fictional universe.

Brand merchandising generally refers to selling products associated with these types of brands, characters, or fictional universes. For example, dolls, toys, or other merchandise may be licensed by the owner of the rights in a given media property, such as action figures of characters from a movie or animated feature. While such products may include the actual characters from a movie, other brand merchandising may associate the name of a character, movie, etc., with a given product. Similarly, some branded or themed merchandising may simply emulate the look and feel of a given media property, without incorporating characters or elements of that media property directly.

In contrast to brand merchandising, product personalization involves creating distinct or unique products for different customers. For example, product personalization may involve something as simple as adding a person's first name to a coffee mug. More sophisticated personalization plans involve incorporating unique characteristics of a given person into products sold to that person. Computer graphics are widely used to create personalized products or merchandise, e.g., a variety of websites allow users to upload a set of photographs to include in a custom-produced book or calendar. Such techniques are often used in conjunction with brand merchandising to market theme-based products to individuals that include some element of personalization and a variety of products which integrate both digital images with branded or themed elements have been marketed to consumers.

While product personalization can help drive product sales, at the same time, personalization can become prohibitively expensive. That is, in many cases the cost of creating distinct products for each customer can exceed the value that can be derived from the custom products.

SUMMARY

One embodiment disclosed herein includes a method for processing three-dimensional (3D) graphics data. This method may generally include receiving a first polygonal mesh representing a humanoid face and determining a mapping the first polygonal mesh to a second polygonal mesh. This method may also include generating, from the mapping, a third polygonal mesh having a topology of the second polygonal mesh and a 3D geometry of the first polygonal mesh. In a particular embodiment, the topology of the second polygonal mesh shares a common topology with a subset of the third polygonal mesh.

Still another embodiment includes a method for processing three-dimensional (3D) graphics data. This method may include removing, from a polygonal mesh representing a humanoid figure, a first plurality of vertices corresponding to a face of the humanoid figure and adding a second plurality of vertices to the polygonal mesh. The second plurality of vertices may share a common topology with the removed first plurality of vertices and may have a different geometry from that of the first plurality of vertices. This method may also include aligning boundary vertices of the second plurality of vertices with boundary vertices corresponding to the face of the humanoid figure and applying a smoothing filter to improve a surface continuity of the polygonal mesh with the aligned boundary.

Still another embodiment includes a figurine generated from a 3D graphics data model generated according to the methods for processing 3D graphics data described just above. For example, the figurine may be generated by printing the 3D graphics data model using a variety of 3D printing techniques.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
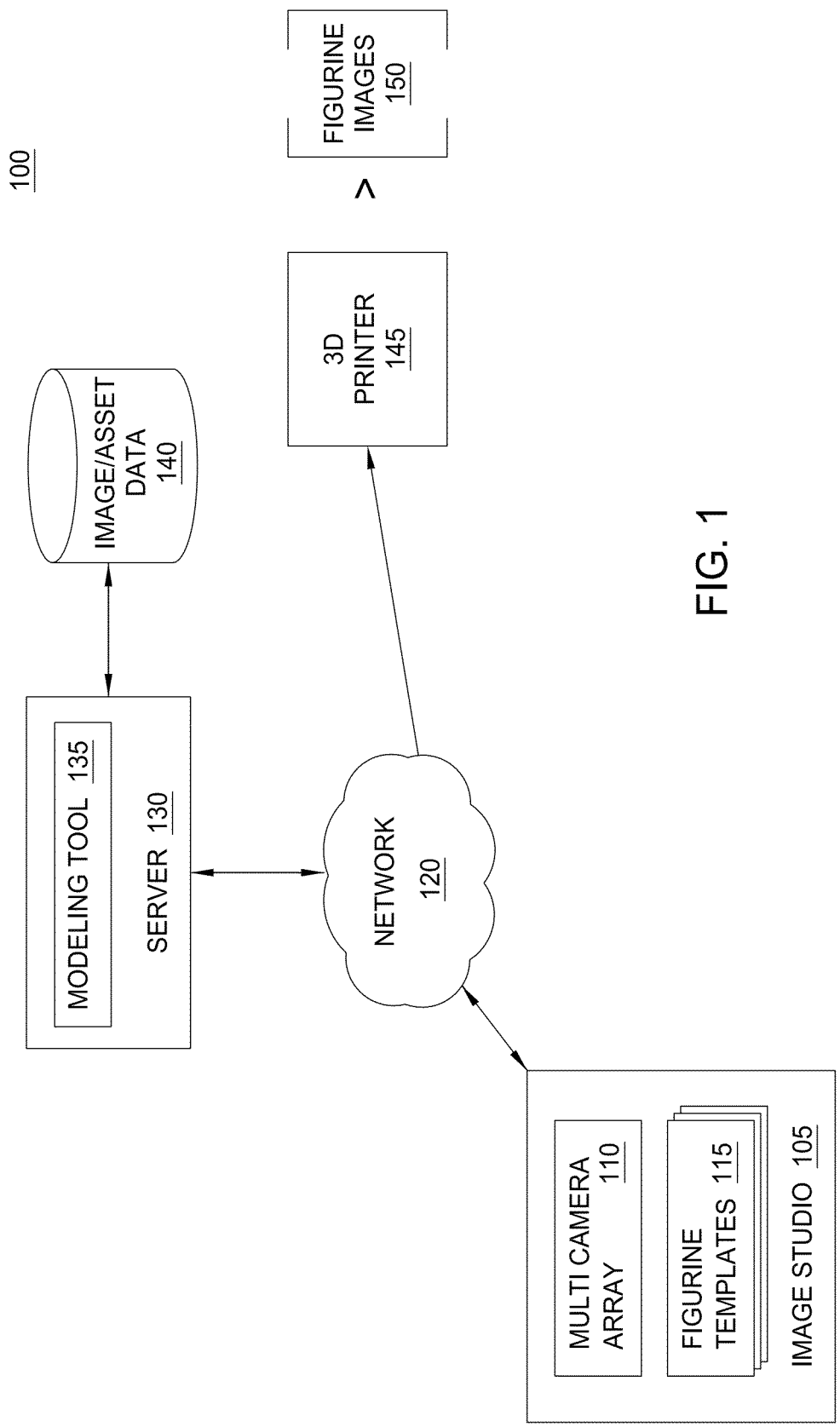
FIG. 1 provides an overview an example environment used to produce personalized figurines from reconstructed 3D image data, according to one embodiment.

Embodiments presented herein provide approaches for creating digital assets that can be used to personalize themed products. For example, one embodiment includes a workflow and pipeline used to generate a 3D model from digital images of a person's face and to manufacture a personalized, physical figurine customized with the 3D model. In this embodiment, a 3D mesh topology of the person's face is simplified to match the topology of the face of a desired figurine. However, while the topology is simplified to match that of the figurine, the 3D model retains the geometry of the child's face. Warping the geometry of the 3D model in this manner allows the simplified mesh topology of the child's face to be integrated with or attached to a mesh representing desired figurine. Doing so results in the mesh of the child's face becoming a sub-mesh of the overall figurine. Alternatively, in some embodiments, the geometry of the child's face could also be warped prior to being mapped to the figurine. For example, the geometry could be warped to give it alien (e.g., pointed ears) or animal (e.g., cat-like nose and eyes) characteristics prior to generating the topology of the 3D model with the child's face.

Additionally, the digital images are used to create a texture map of the child's face. This texture map may be applied to the deformed mesh and blended with a texture of the desired figurine—resulting in a personalized digital asset which may be used to create a variety of personalized products. For example, the digital asset can be supplied to a 3D printer and used to create a physically realized version of the 3D model, i.e., a princess doll with the shape and color generally matching the child's face. Other uses of this digital asset include creating images or renderings that can be applied to or incorporated with variety of products. Further, the digital asset can be used in creating other digital assets, e.g., rendering animation sequences. For example, the 3D model created using this process could be animated to appear dancing with another character from an animated feature.

Note, the following description references embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

As noted above, one embodiment provides a workflow for capturing and manipulating a 3D mesh of a child's face in order to attach it to a mesh of a figurine, and once attached, 3D printing techniques may be used to create a physically realizable version of the figurine. Note however, embodiments are not limited to the particular example of a child's face and a princess figurine. Instead, the workflow for creating (and physically realizing) digital assets described herein may be adapted in a variety of ways to personalize branded merchandise.

FIG. 1 shows an example environment 100 used to produce personalized figurines from reconstructed 3D image data, according to one embodiment. As shown, the environment 100 includes an imaging studio 105, a server computing system 130, and a 3D printing system 145, each connected to a data communications network 120. The imaging studio 105 provides a physical space used to capture camera images of a subject, e.g., images of a child's face. Accordingly, the imaging studio could be setup at a theme park, allowing visitors to purchase branded, yet personalized, merchandise, e.g., doll figurines modeled after theme-park mascots, characters from books, movies, animated features, video games, etc.

As shown, the imaging studio 105 includes a camera array 110 and figurine templates 115. The multi-camera array 110 includes a set of cameras used to capture multiple, simultaneous images of a person's face. For example, in one embodiment, an array of eight DSLR cameras is used to capture multiple images of a subject's face in a fraction of a second. A detailed example of a multi-camera array is described in United States Patent Publication 2011/0175900 A1, titled System and Method for Mesoscopic Geometry Modulation, which was filed on Jan. 18, 2010, and is incorporated by reference herein in its entirety (the "'900 application"). In this embodiment, the eight-camera array allows an operator to capture multiple images of a subject's face essentially simultaneously. Once captured, a computing system at the imaging studio 105 may allow the operator and customer to review the images, select one to use in creating a digital asset, as well as capture other customer information, e.g., name, address, email and other contact information).

The imaging studio 105 also includes a set of figurine templates 115. As described in greater detail below, figurine templates 105 correspond to figurines that may be produced as a combination of a mesh representing a given figurine and 3D graphics data generated from images captured using the multi-camera array 110. The figurine templates 115 templates may be physical models of mascots or characters from books, movies, animated features, video games, etc. For example, the figurine templates 105 could be different "princess" characters from a library of animated features. In addition to the physical figurine templates, digital models of the templates could be presented to customers allowing, e.g., different colors, dresses, poses, or other characteristics to be selected by a customer.

Once the images of a given subject are obtained and approved, they may be transmitted over the network 120 to server 130 for further processing. Alternatively, the server 130 could also be a computing system at the imaging studio 105 or even the same system connected to the multi-camera array 110. In either case, once received on the server 130, the images are stored in a database as image/asset data and processed by a modeling tool 135.

The modeling tool 135 provides a software application configured to process the 2D images of the subject captured using the multi-camera array 110. In one embodiment, the processing performed by the modeling tool 135 may include actions generally referred to as a reconstruction phase, a registration phase, and a composition phase. During the reconstruction phase, the modeling tool 135 generates a 3D mesh (a set of vertices in a 3D coordinate space, and edges connecting specified vertices). Each vertex of the mesh may be associated with a color value. In one embodiment, the vertex color values may be used to create a texture map during the registration process. For example, the multi-camera array described in the '900 application mentioned above provides eight different 2D view of the subject used to reconstruct a highly detailed mesh and of the subject's face. Of course, approaches other than the ones described in the 900' application could be used to create a 3D graphical model of a subject. For example, laser mapping techniques, as well as plaster casting techniques could be used to reconstruct or otherwise create a 3D graphical model of a subject.

In one embodiment, during the registration phase, an operator identifies a set of feature points on the raw 3D mesh generated from the camera images. For example, the operator may identify the center of each eye, an apex of a nose, and other landmark points in the 3D mesh generated from the images. The feature points are used as guidelines to automatically fit a 3D face mesh of the selected figurine to the raw 3D mesh of the subject. After fitting, a texture extraction process may convert vertex colors from the raw 3D mesh into a uv-texture map. The registration phase reduces the geometry of the raw 3D mesh to make it more manageable for printing and artistic modeling, as well as applies texture mapping to retain color detail. More specifically, the topology of the raw 3D mesh (i.e., the set of vertices and connections between vertices) is simplified to match one created for the desired figurine, while retaining the general geometry and color. Additionally, the topology is normalized using the identified feature points, e.g., to ensure that each landmark point in the 3D mesh of the subject corresponds to the same landmark points in the 3D mesh of the figurine.

At the same time, the warped mesh retains the same general geometry of the subject's face. The resulting mesh may then be integrated as a sub-mesh of the figurine and textured using the texture map generated from the camera images. Further, mesh data unneeded to create the figurine may be discarded at this point, such as portions of the mesh corresponding to the neck, hair and ears of the subject. Of course, depending on the particular figurine or intended use of the digital asset, some (or all) of this information may be retained.

In context of this disclosure the topology of a polygonal mesh refers to the connectivity of its vertices, i.e., how many vertices it has, and which pairs of vertices in the mesh are connected by edges. In contrast, the geometry of a polygonal mesh refers to the positions of mesh vertices in three-dimensional space. For example, if mesh A is generated by copying mesh B and subsequently warping mesh A, i.e., moving its vertices in three-dimensional space, without changing their connectivity, then mesh A and mesh B have the same topology but different geometry.

During the composition phase, the modeling tool 135 warps a geometry of the mesh of the desired figurine head to fit the mesh generated during the registration phase. In one embodiment, the warping process is tailored so that deformation of the head geometry is minimal, without deforming the registered face geometry (obtained during the registration phase) or changing the mesh providing the remainder of the body of the figurine. After the composition phase, the composed mesh may be presented to an artist for coloring and quality control. For example, the artist may select colors to be applied to the neck and arms of the figurine based on the skin color of the subject. Finally the artist may blend boundaries between solid skin color and the texture obtained from the scanning process. Of course, in alternative embodiments, the modeling tool 135 may be configured to color match and blend of colors of the registered face and the figurine (e.g., using statistical sampling and blending techniques).

In short, the imaging, reconstruction, registration and composition processes provide an automated pipeline used to create a digital asset which personalizes portions of a character to match the physical appearance of a given subject. In the given example, to personalize a princess character with a facial appearance of a given child. Once created, the resulting digital asset can be provided to a 3D printing machine 145 to create a physically realized copy of the digital asset. Again referring to the given example, a physical figurine having the appearance of the desired princess character that has been personalized with the face of the given child.

Figure 2:
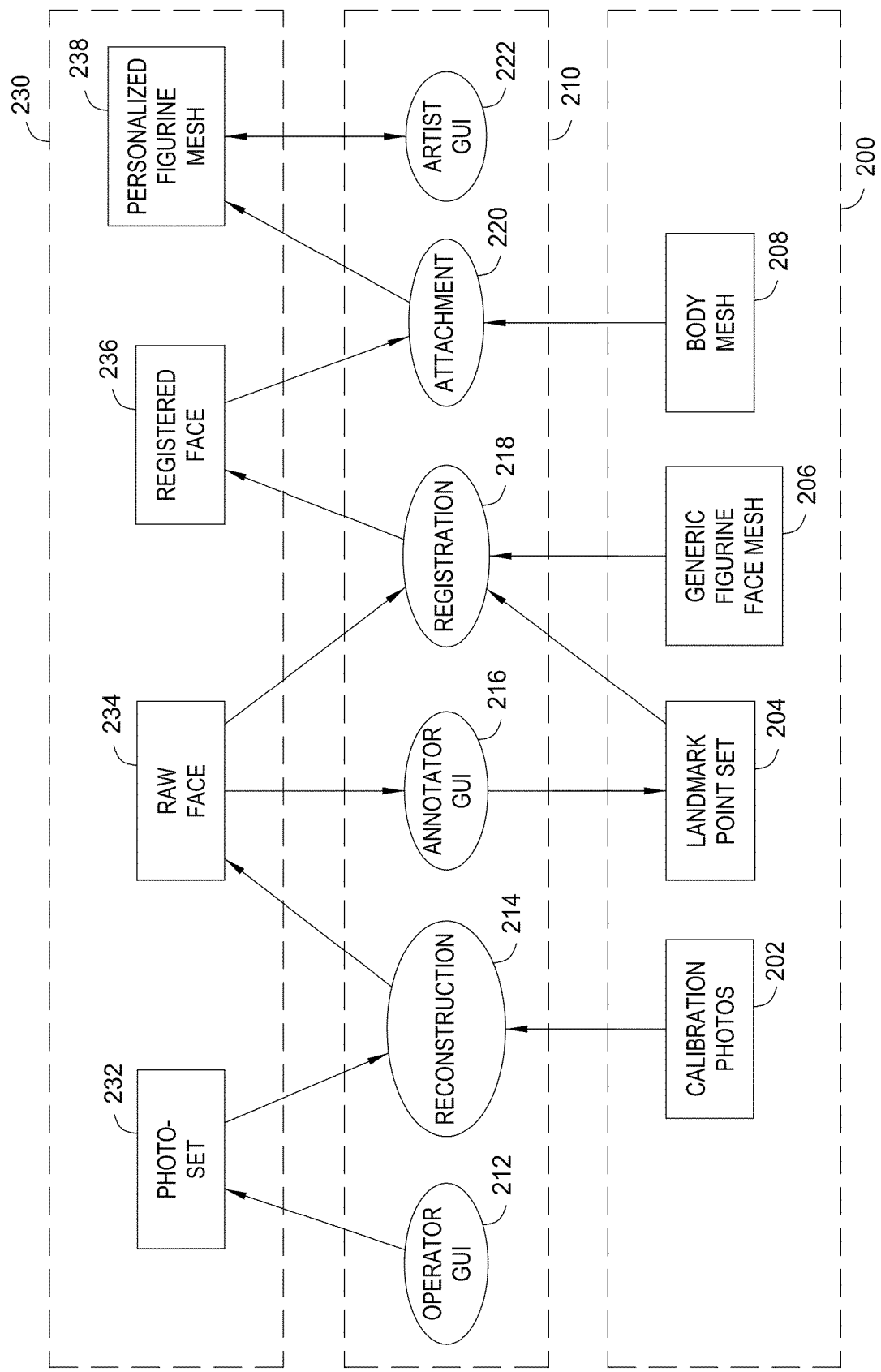
FIG. 2 illustrates an example workflow for producing personalized figurines using the environment of FIG. 1, according to one embodiment.

FIG. 2 further illustrates the general workflow for creating digital assets described just above. More specifically, FIG. 2 illustrates an example workflow 210 for producing personalized figurines using the environment of FIG. 1, according to one embodiment. As shown, the workflow 210 includes a set of system interfaces 212, 216, and 222 and processes 214, 218, and 220, performed by one or more computing systems to create a personalized digital asset. Additionally, data elements 200 and 230 are created/used during the workflow 210. Data elements 230 correspond to subject-specific data, i.e., data used obtained from or created relative to a specific individual in creating a personalized figurine mesh (and physically realized figurine). In contrast, data elements 200 correspond to system-wide data, i.e., data elements that are used by workflow 210 independent of any particular individual.

As shown, the first element in the workflow 210 is an operator interface 212. The operator interface is used to capture a photoset 232 in conjunction with a multi-camera array. The photoset 232 provides the raw set of images used by subsequent states of the pipeline. In one embodiment, the photoset 232 may include multiple images of the subject taken essentially simultaneously by multiple cameras. An operator may take multiple images of a subject (e.g., multiple images of a child's face) and present them for review on the operator interface 212. Once an image is selected, the photoset 232 corresponding to the selected image is passed to the reconstruction process 214. In addition to the instance specific photoset 232, reconstruction process 214 also receives a set of calibration photos 202. The calibration photos 202 are used to define the relative spatial positions of each camera in the array.

Figure 6B:
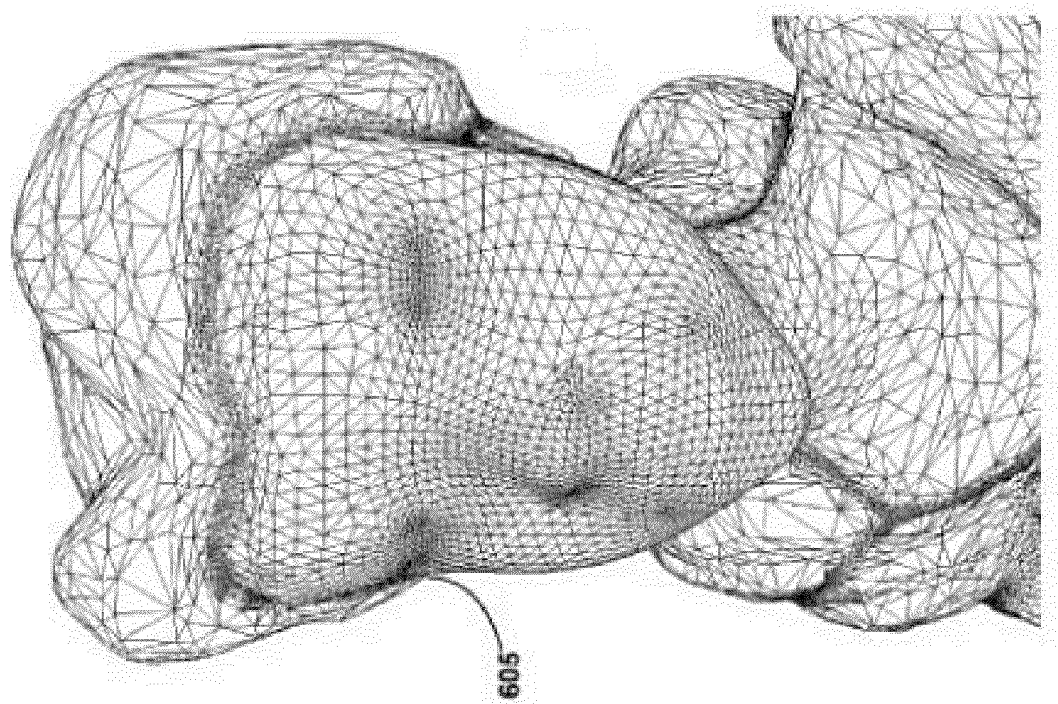
FIGS. 6A-6B illustrate an example of reconstructed 3D geometry and figurine mesh, according to one embodiment.
Figure 6A:
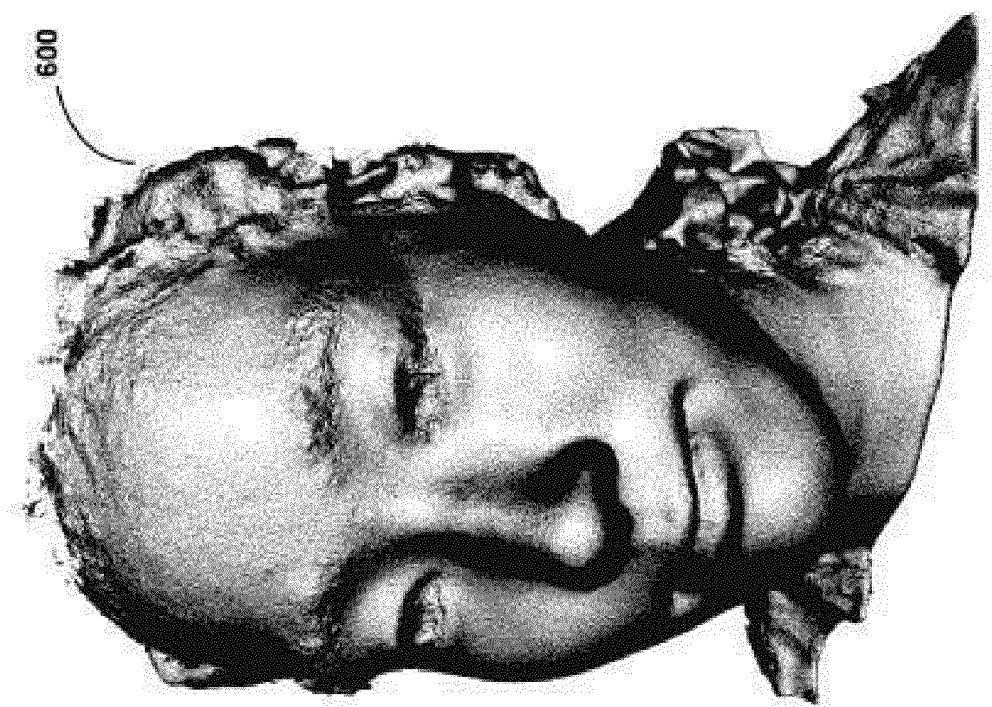

Once the photo set 232 and calibration photos 202 are received, the reconstruction process 214 generates raw face data 234. The raw face data 234 provides a detailed 3D mesh reconstructed from the photoset 232. FIG. 6A shows an example of a raw face 600 reconstructed from images of a female child's face. As can be seen, the level of detail in the raw face 600 is quite high. In fact, the process disclosed in the 900' application results in a face mesh where individual polygons in the mesh are smaller than the pixel size of most displays. Accordingly, the raw face mesh 600 shows a level of detail that can capture the position of individual hairs in the eyebrows and eyelashes and variations in skin texture. In contrast, FIG. 6B shows a mesh 605 for the head of a princess figurine. Unlike raw face 600, the individual polygons and vertices making up the mesh 605 are visible. Thus, while plainly recognizable as a human face, the level of detail in the figurine mesh 605 is much less than shown in the raw face 600.

Referring again to FIG. 2, the output of the reconstruction process 214—i.e., the raw face data 234—is passed to both an annotator interface 216 and a registration process 218. The annotator interface 216 allows an operator to identify a set of key landmark or feature points on the raw face.

More generally, the registration process 218 is performed to identify a mapping that deforms the geometry of a second polygonal mesh (i.e., a generic face mesh associated with a figurine) without altering its topology to match the geometry of the first polygonal mesh (i.e., the mesh reconstructed from 3D image data of the child's face. More specifically, in one embodiment, the mapping is guided by a set of feature points manually identified on the first polygonal mesh that correspond to a set of feature points on the second polygonal mesh. The mapping is then established by warping or otherwise deforming the second polygonal mesh to match the feature points on the first polygonal mesh. Following the mapping of feature points, a non-rigid optimization may be used to continue to deform the second polygonal mesh until its geometry matches that of the first polygonal mesh. One example of a non-rigid optimization is described in Tena, J. R. Hamouz, M. Hilton, A. Illingworth, J. "A Validated Method for Dense Non-Rigid 3D Face Registration", Video and Signal Based Surveillance, 2006. AVSS '06. IEEE International Conference on Video and Signal Based Surveillance, which is herein incorporated by reference in its entirety. Of course, other approaches for deforming this polygonal mesh may be used.

Alternatively, feature points used to guide the mapping may be automatically determined by the system by analyzing the geometry of the polygonal meshes. In yet another embodiment, the mapping is established directly without the need of any feature points. More generally, the only restriction on the mapping is that it should transform the geometry of the second polygonal mesh into that of the first polygonal mesh, without modifying the topology of the second polygonal mesh. Note, for purposes of discussion, the mesh resulting from deforming or otherwise warping a portion of the second polygonal mesh (e.g., a subset of the second polygonal mesh corresponding to the face of a figurine) may itself be referred to as a third polygonal mesh.

Figure 7B:
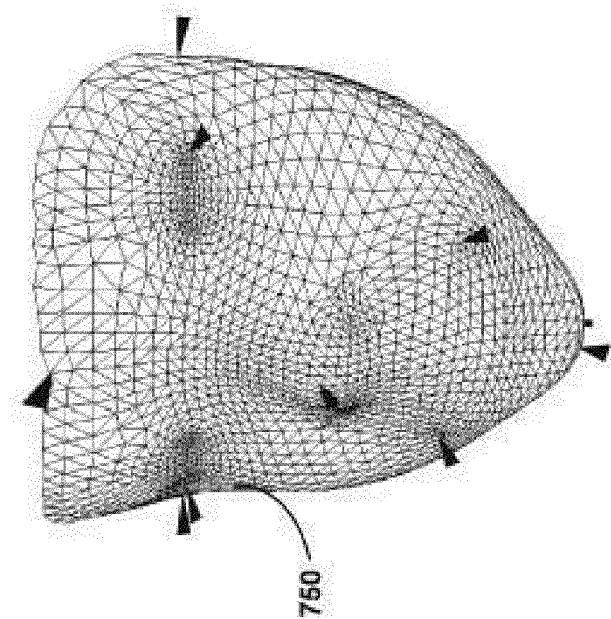
FIGS. 7A-7B illustrate an example of feature points on both a reconstructed 3D geometry and figurine mesh, according to one embodiment.
Figure 7A:
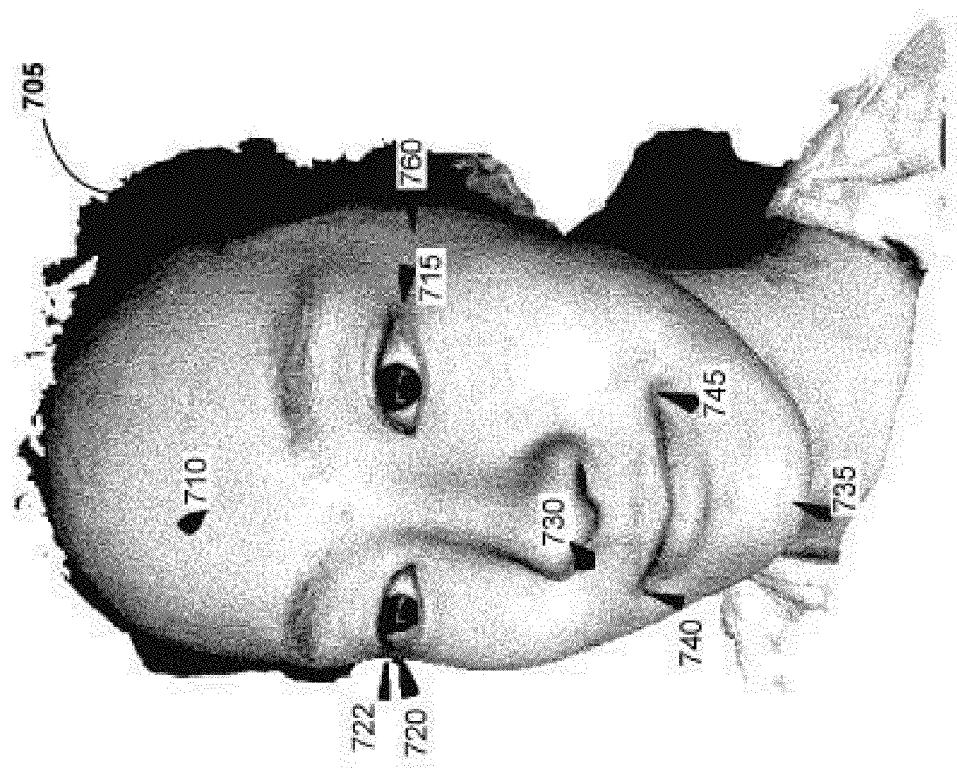

For example, FIG. 7A shows a raw face image 705, with a number of specific points annotated by an operator. Specifically, a forehead/hair junction point 710, a left and right eye edge point 715, 720, a left and right face edge point 722, 760 and a nose tip point 730, left and right mouth points 740, 745, and a center chin point 735. FIG. 7B shows a corresponding set of points marked using arrows on a princess figurine mesh 750. Of course, the specific landmark points and the semantics associated with such points may be selected to suit the needs of a particular case.

Figure 8B:
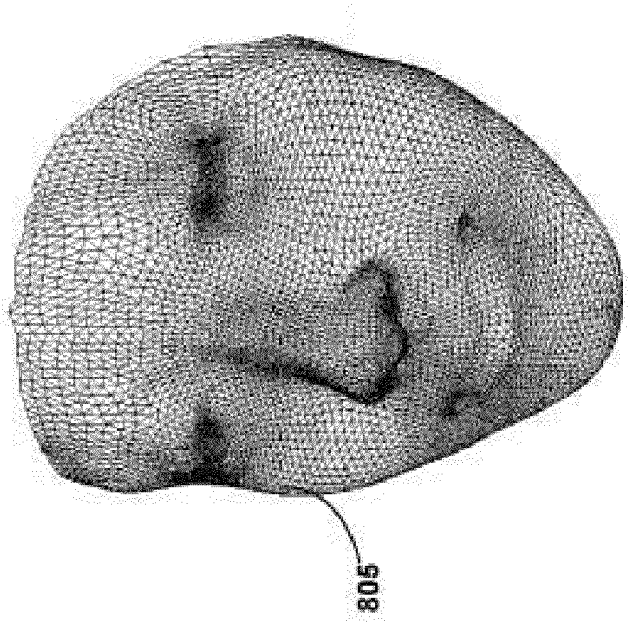
FIGS. 8A and 8B illustrate a texture and mesh of a registered face, according to one embodiment.

FIG. 8B shows the results of the registration process 218 performed on the raw face data 234. Specifically, a simplified face mesh 805 in FIG. 8B has the topology of the princess figurine mesh 750 shown in FIG. 7B. At the same time, the simplified face mesh 805 retains the geometry of the raw face data 234. That is, while being modeled with a reduced number of edges and vertices (a simplified topology), the general geometry of the simplified face mesh 805 in FIG. 8B matches the shape of the girl's face. In addition to reducing the number of polygons, the registration process normalizes the remaining vertices to match those of the figurine face mesh 206 based on the landmark point set. For example, the nose tip point 730 (from FIG. 7A) specified by the operator is mapped to the corresponding nose tip vertex in the figurine mesh 750.

Figure 8A:

Once generated, the texture map may be applied the simplified face mesh 805 to produce a registered face 236. The registered face 236 may include the simplified face mesh 805 and a uv-texture map used to color the simplified face mesh 805. For example, FIG. 8A shows an example mesh 800 created using the texture map obtained from the original photoset 232. In this example, the registered face of mesh 800 discards mesh data of the girl that is not going to be used to personalize the figurine; specifically, the ears, hair, and a portion of the forehead of the girl's face have been discarded as part of registration process 218.

Referring again to FIG. 2, the output of the registration process 218—i.e., the registered face 236—is passed to an attachment process 220. In one embodiment, the inputs to the attachment process 220 include the outputs from the registration process 218, including, e.g., the third polygonal mesh (i.e., the deformed portion of the second polygonal mesh with geometry matching of the first polygonal mesh), the second polygonal mesh (the humanoid body with the generic face mesh prior to being deformed), and a set of predefined feature points identified on the second polygonal mesh.

In one embodiment, the first step in the attachment process 220 is to remove, from the second polygonal mesh (again, the mesh with the humanoid body and generic face), certain vertices corresponding to the topology of the third polygonal mesh. Specifically, vertices of the generic humanoid face are removed from the mesh of the humanoid figurine, with the exception of the vertices that correspond to the boundary of the face and the remainder of the humanoid figurine mesh. After this process, the vertices of the boundary of the third polygonal mesh correspond to the vertices of the boundary of the second polygonal mesh, however the boundary vertices of the third polygonal mesh are not aligned with the boundary vertices of the second polygonal mesh (i.e. there gaps are present between the third polygonal mesh, or new face, and the second polygonal mesh, or figurine body).

The next step in the attachment process 220 is to close gaps between the misaligned boundaries of the third and second polygonal meshes. That is, to close gaps between the deformed face mesh of the child's face and the generic mesh of the figurine body. To do so, in one embodiment, the second polygonal mesh (the figurine mesh) is warped until its boundary aligns with that of the third polygonal mesh (the deformed face match matching the geometry of the child's face). Note however, the third polygonal mesh is not warped because doing so would result in distortions to the geometry of the third polygonal mesh, eliminating the correspondence between the geometry of the first polygonal mesh. That is, warping this mesh would distort the geometry of the child's face. Further, the second polygonal mesh should not be warped indiscriminately because then the geometry of the second polygonal mesh may become be unreasonably distorted.

To address these concerns, the attachment process 220 may warp or otherwise deform the second polygonal mesh (again, in this context the second polygonal mesh refers to the body of the figurine) while enforcing a set of constraints. In one embodiment, the constraints may include the predefined feature points on the second polygonal mesh and the boundary vertices of the third polygonal mesh. For example, the predefined feature points may include two rings of vertices, one around the head of the second polygonal mesh (i.e., the humanoid body) on the coronal plane and a second ring around the base of the neck of the of the second polygonal mesh (i.e., humanoid body) on a transverse plane.

Using these constraints allows the attachment process 220 to warp the second polygonal mesh to close gaps and align its boundary with that of the third polygonal (i.e., the deformed face mesh) mesh while ensuring (i) that the head remains humanoid and (ii) that the topology and geometry underneath the neckline remains unaltered. Doing so largely preserves the overall geometry of the second polygonal mesh and keeps the geometry of the third polygonal mesh unchanged. Next, the third and second polygonal meshes are integrated into a single mesh by fusing the boundary vertices of the third and second polygonal meshes. The fused vertices are referred to as "seam vertices."

The next step in the attachment process 220 is to perform a filtering process. The filtering process may take as input the single mesh obtained by fusing the boundary vertices of the second and third polygonal meshes. That is, the mesh with the body of the figurine and the particularized geometry of the child's face. In one embodiment, the seam vertices of the this mesh are filtered using an iterative approach that may include applying a geometry smoothing filter first to the seam vertices and their second-ring neighborhood, then again to the seam vertices and their first-ring neighborhood, and finally to the seam vertices only. Using this iterative approach may result in a smooth transition between face and body and a highly integrated figurine model. Thus, this approach avoids occlusions or points or edges when the final model is printed using a 3D printing system and accurately attaches the reconstructed geometry of the child's face to the generic figurine body.

Figure 12:
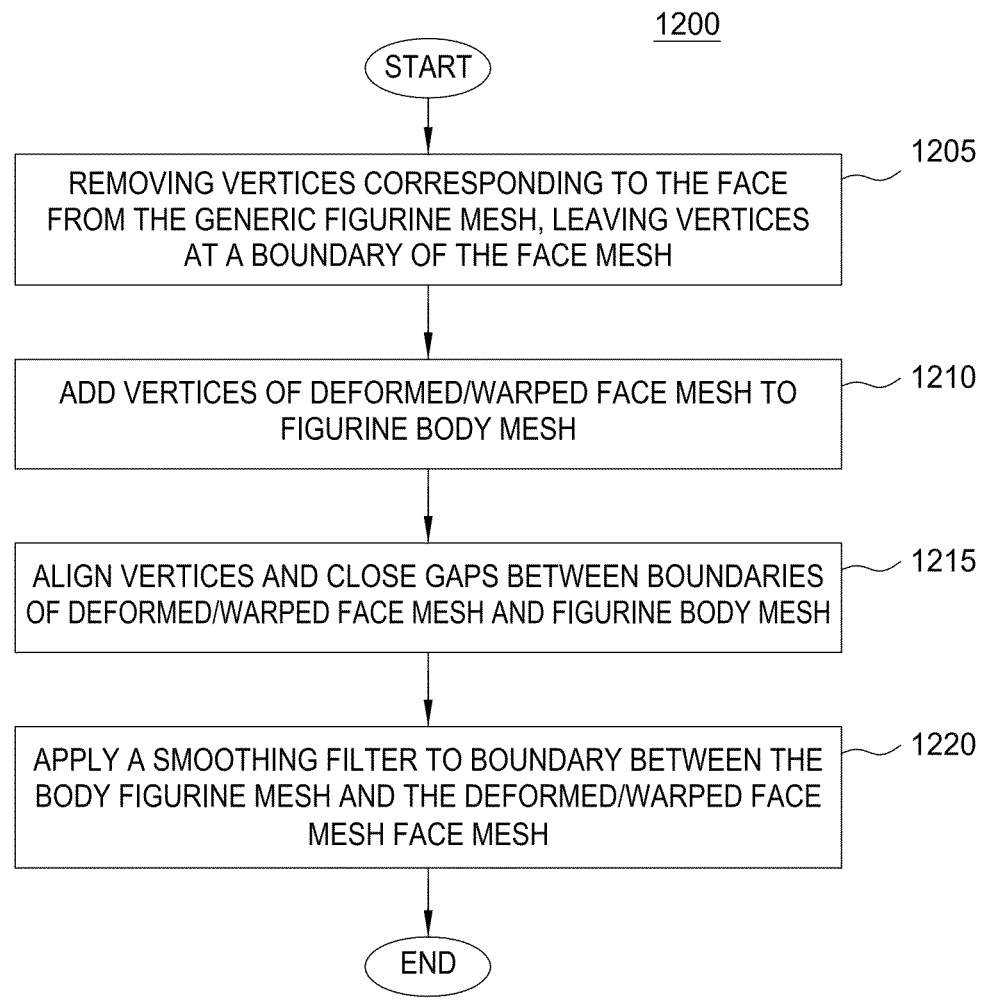
FIG. 12 is a flow diagram further illustrating a process for joining a user-specific face mesh with a generic figurine mesh, according to one embodiment.

FIG. 12 illustrates a method 1200 summarizing the attachment process 220. As shown, the method 1200 begins at step 1205 where the attachment process 220 removes vertices corresponding to the face of the generic figurine mesh from this polygonal mesh. However, vertices a boundary the generic face mesh and the rest of the figurine may be left in the figurine mesh.

At step 1210, the attachment process 200 replaces the removed vertices with vertices of the deformed generic face mesh (i.e., the third polygonal mesh discussed above). At this point, the vertices of the boundary of the third polygonal mesh correspond to the vertices of the boundary of the second polygonal mesh, but the meshes remain unaligned. Accordingly, at step 1215, the attachment process 220 closes gaps between boundaries of the third and second polygonal meshes. Doing so creates a "closed" figurine surface. And at step 1220, the attachment process 220 may apply a smoothing filter to improve the surface continuity at the point of attachment between the body figurine mesh and the custom face mesh.

Figure 9B:
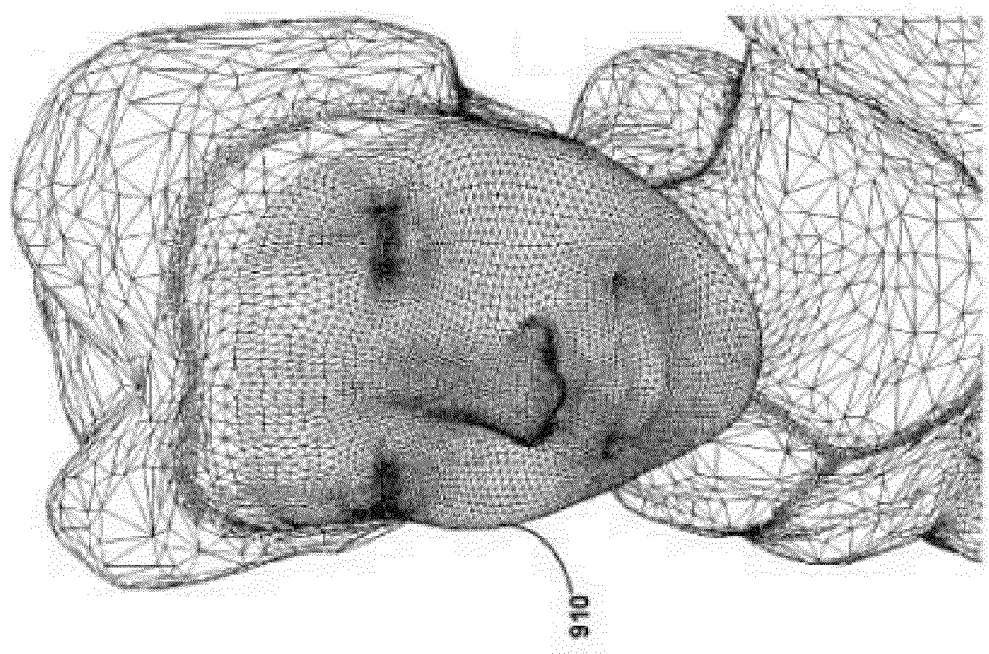
FIGS. 9A and 9B illustrate the registered face attached to the mesh of a figurine, according to one embodiment
Figure 9A:
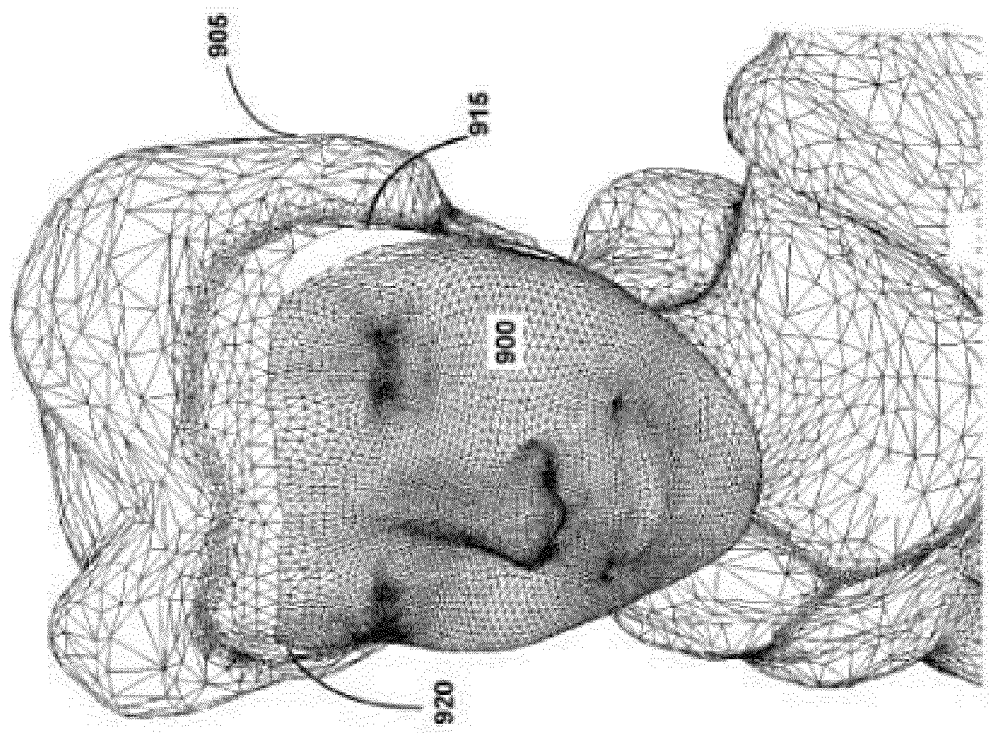

Portions of the attachment process 220 are shown in FIGS. 9A and 9B. For example, as shown in FIG. 9A, a face mesh 900 (corresponding to the registered face 236) has been attached to a body mesh 905. And FIG. 9B shows a personalized figurine mesh 910 after the gaps 915, 920 present in the raw mesh of FIG. 9A have been closed.

Figure 10B:
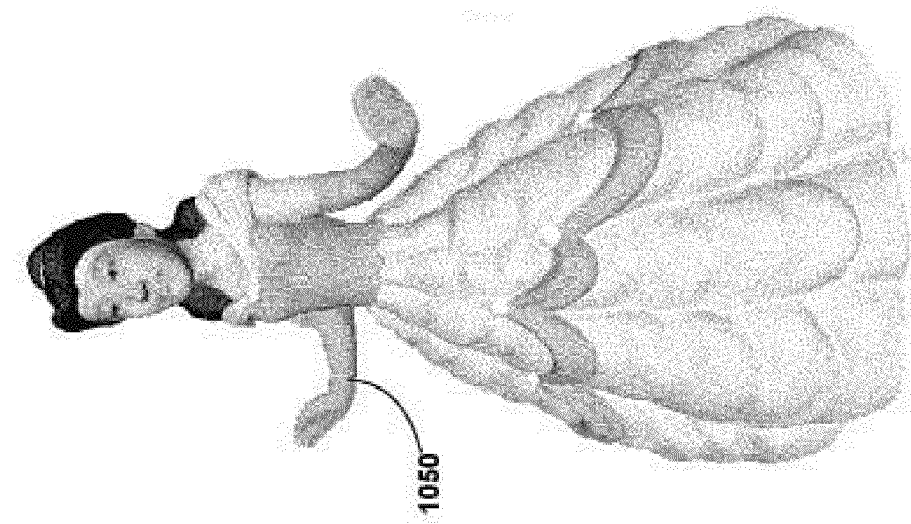
FIGS. 10A and 10B illustrate a texture of the registered face blended with the mesh and texture of a figurine, according to one embodiment.
Figure 10A:
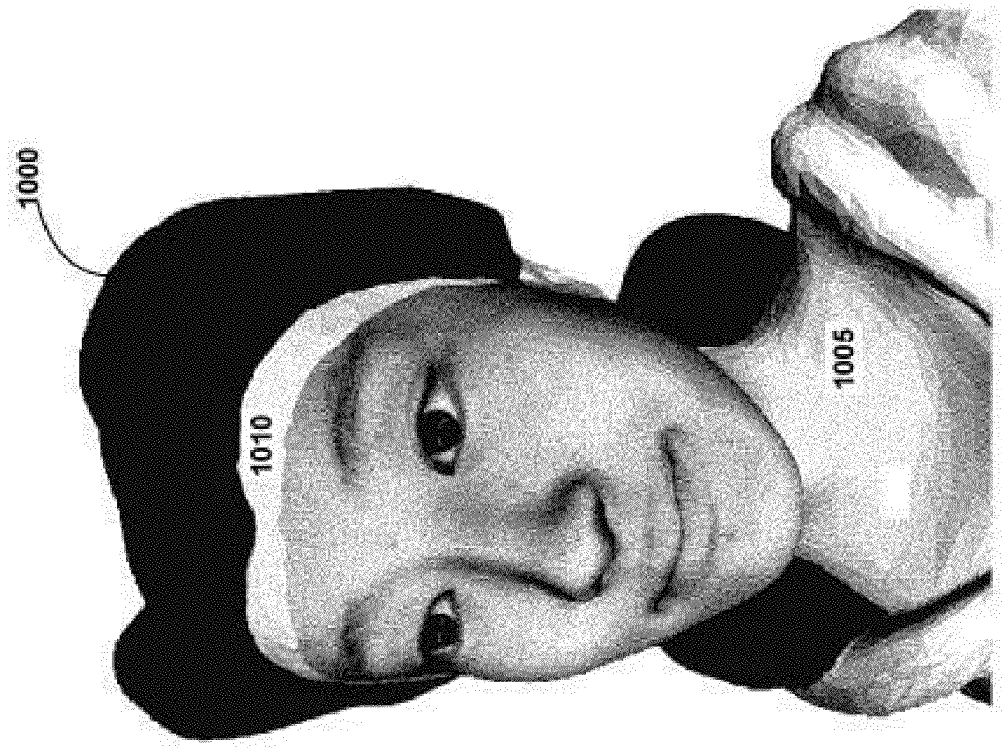

The resulting figurine mesh 910 provides the final personalized digital asset mesh for 3D printing (or for other uses of this digital asset). As noted above, the registered face 236 also includes a uv-texture map in addition to the figurine mesh. For example, FIG. 10A shows the texture of the registered face applied to the figurine mesh 1000. However, the color tones of this texture map are different from the texture map of the original figurine. For example, the color in region 1010 does not match the color of the texture of the registered face. Similarly, the neck region 1005 does not match the color of the texture of the registered face.

In one embodiment, the artist interface 222 presents the personalized figurine mesh 238 to an operator for review and editing. Accordingly, the artist interface 222 allows the operator to blend colors in the texture map and, if needed, alter any geometry created by the attachment and closure processes discussed above. The artist interface 222 may also allow the operator to edit other portions of the personalized figurine mesh 238. FIG. 10B shows the complete 3D personalized figurine mesh, with the geometry of the registered face 236, colored with the texture of the princess figurine and the texture of the registered face 236. As noted above, this digital asset may be supplied to a 3D printer to create a physically realized version of the princess figurine, personalized with a given child's face.

Figure 3:
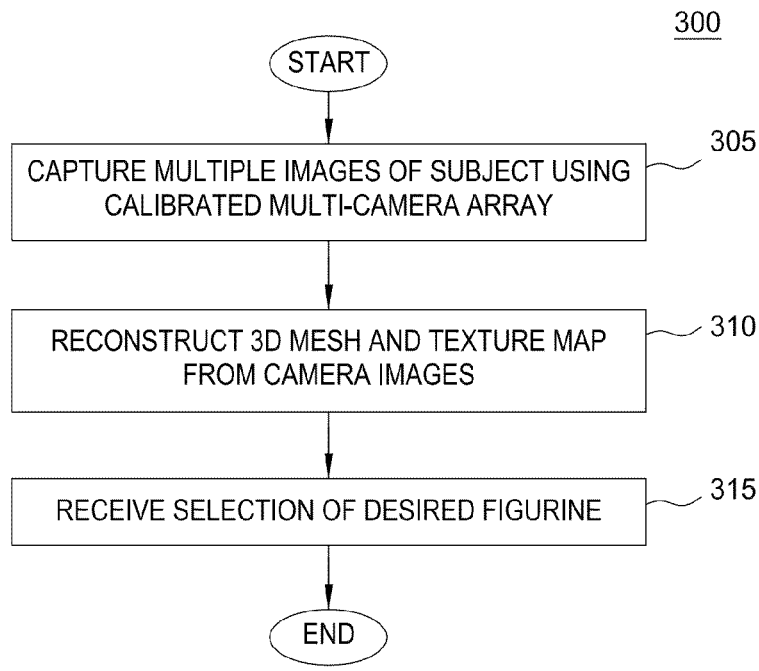
FIG. 3 illustrates a method for capturing 3D image data used to produce a personalized figurine, according to one embodiment.
Figure 4:
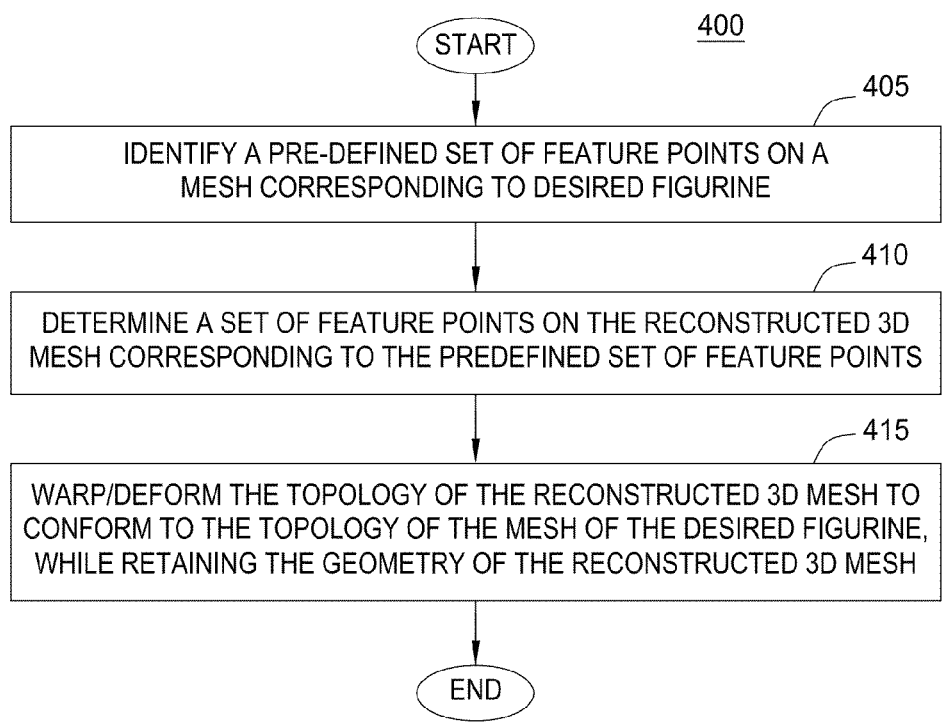
FIG. 4 illustrates a method for integrating a mesh derived from the 3D image data with 3D geometry representing a figurine, according to one embodiment.
Figure 5:
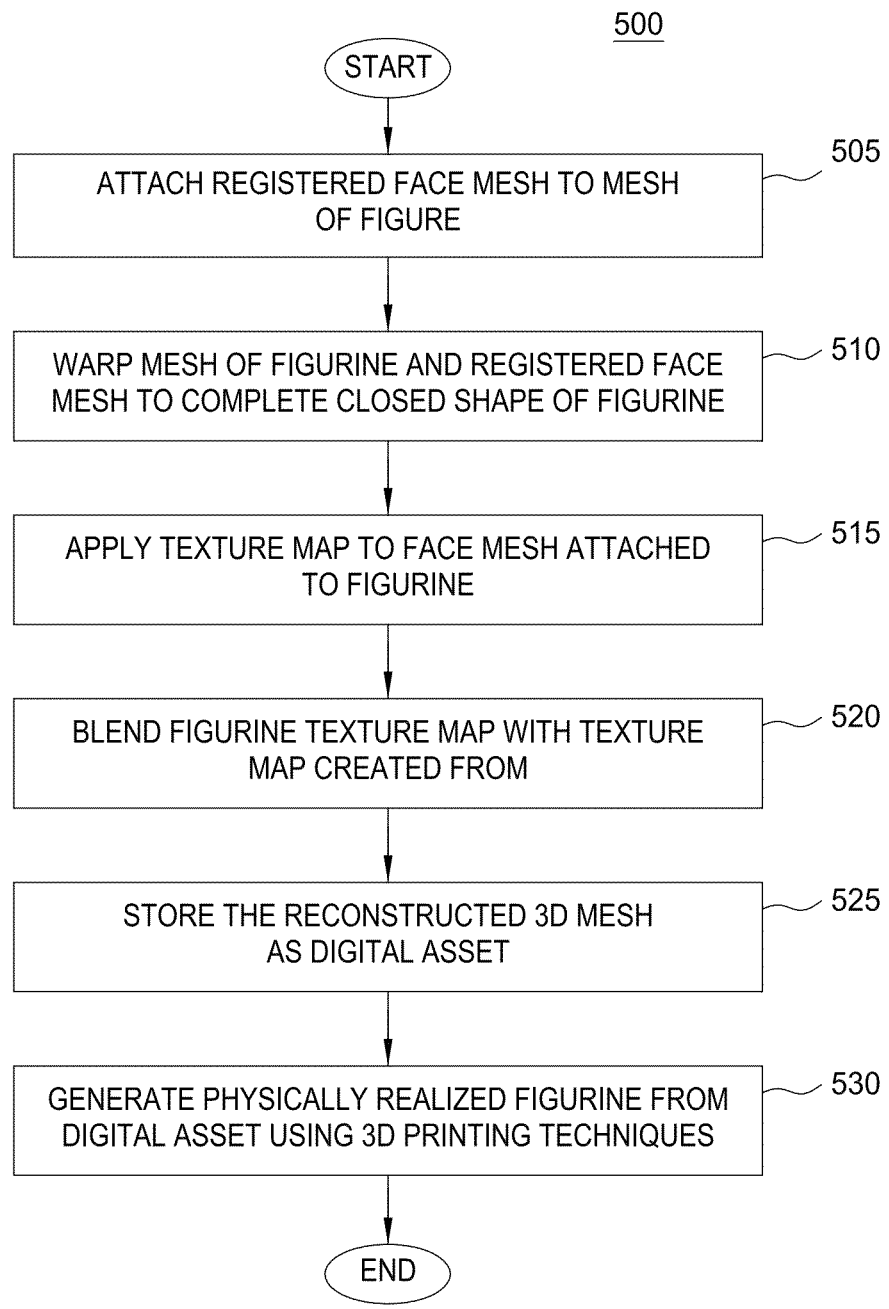
FIG. 5 illustrates a method for creating physically realizable figurine from the computer graphics data generated according to the methods shown in FIGS. 3 and 4, according to one embodiment.

FIGS. 3-5 illustrate methods associated with the workflow of FIG. 2. First, FIG. 3 illustrates a method 300 for capturing 3D image data used to produce a personalized figurine, according to one embodiment. As shown, the method 300 begins at step 305, where an operator captures multiple images of a subject using a calibrated multi-camera array. Accordingly, at step 310, the computing system reconstructs a 3D mesh from the camera images. The images of the subject are used to reconstruct a first polygonal mesh of the subject. The first polygonal mesh corresponds to the highly detailed 3D geometry recreated using the images captured by the multi-camera array. Further, each vertex of the reconstructed mesh may be associated with a color value. As noted above, e.g., in one embodiment multiple DLSR cameras are configured to capture multiple images of a subject's face essentially simultaneously from multiple viewpoints and calibrated by estimating their positions, orientations, and other parameters.

The resulting digital images are provided to a computing system configured to perform the reconstruction, registration, and attachment processes described above. In addition, the operator obtains a selection of a desired figurine (at step 315). The desired figurine may have a set of associated digital assets, including, e.g., a second polygonal mesh corresponding to the geometry of the face (and/or body) of the desired figurine.

Once the raw 3D image data of the image subject is reconstructed, it is processed by the registration and attachment processes to integrate it with a 3D model of the desired figurine. For example, FIG. 4 illustrates a method 400 for integrating a mesh derived from the 3D image data with 3D geometry representing a figurine, according to one embodiment. As shown, the method begins at step 405, where the registration process identifies a predefined set of feature points on a mesh corresponding to the selected figurine (i.e., a set of feature points on the second polygonal mesh mentioned just above). As noted, the points correspond to a specified set of landmark vertices on the figurine mesh, e.g., the tip of the nose, apex of the forehead, etc. The mesh associated with the figurine (again, the second polygonal mesh) provides a face mesh with known topology and generic geometry. Thus, in contrast to the first polygonal mesh reconstructed from the images captured using the multi-camera array, the second polygonal mesh provides a subject-independent input to the system. Note, the second polygonal mesh may be a subset of a larger model. For example, the figurine may also have an associated model of both face and body, with known topology and generic facial geometry (again, providing a subject-independent input to the system).

For each landmark point, an annotator interface may prompt an operator to identify the corresponding point on the raw 3D mesh (step 410). That is, at step 410, the operator identifies a feature point on the reconstructed 3D mesh corresponding to the predefined set of feature points. At step 415, the topology of raw image data (i.e., the set of connected vertices) is simplified to conform to the topology or the mesh of the desired figurine. The system creates a personalized model—a third polygonal mesh—having the topology of the generic face and/or figurine, but retaining the geometry of the first polygonal mesh. That is, while the topology is simplified to match that of the figurine, the geometry of the raw 3D image data is largely retained, as shown in the Example of 7B (the figurine face mesh) and FIG. 8B which shows the deformed face mesh with geometry of the child's face represented using the topology of the figurine face. Additionally, a texture map created from the raw 3D data is used to create a uv-texture map corresponding to the warped face mesh, as shown in the example of FIG. 8A.

FIG. 5 illustrates a method 500 for creating physically realizable figurine from the computer graphics data generated according to the methods shown in FIGS. 3 and 4, according to one embodiment. As shown, the method 500 begins at step 505 where the attachment process 220 attaches the registered face mesh to the mesh of the figurine. At step 510, the registered face, as attached to the figurine body mesh, may be warped as necessary to create a fully closed figurine surface.

At step 515, the texture map of the registered face is applied to the figurine mesh created at step 510. And at step 520, colors of the figurine mesh are blended to match colors in a texture map of the figurine. For example, the forehead, neck, and arms of the princess figurine shown in FIGS. 10A and 10B are blended to match the colors of the texture map of the registered face. At step 525, the completed final mesh generated at steps 505-520 is stored as a personalized digital asset that may be used for a variety of purposes. For example, at step 530, the mesh may be supplied to a 3D printing system configured to create a physical realized version of the 3D geometry with the geometry of the figurine mesh. As noted, other uses of this digital asset include creating images or renderings that can be applied to or incorporated with variety of products. Further, the digital asset can be used in creating other digital assets, e.g., rendering animation sequences. For example, the 3D model created using this process could be animated to appear dancing with another character from an animated feature.

Figure 11:
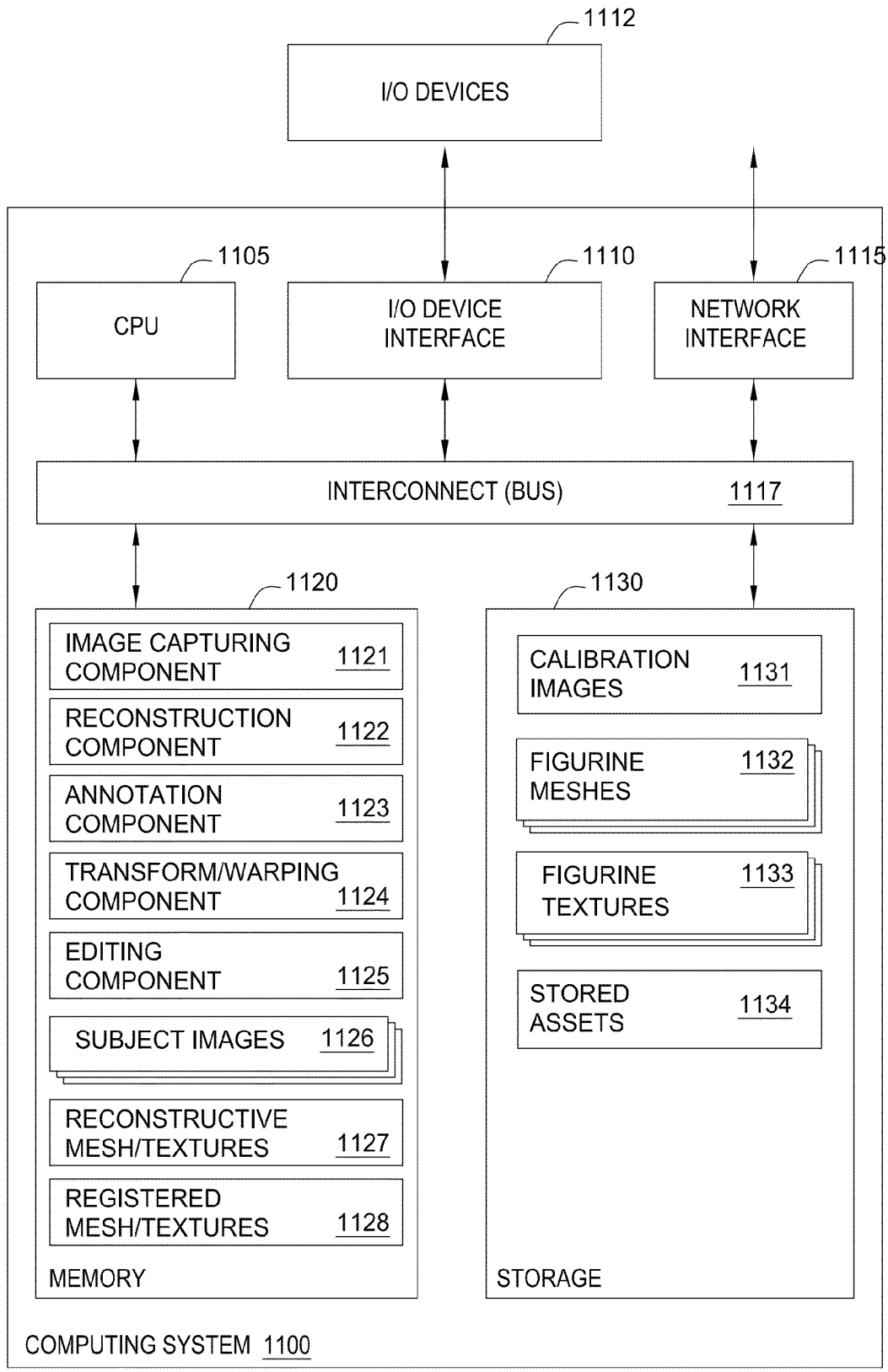
FIG. 11 illustrates an example computing system configured according to an embodiment of the invention.

FIG. 11 illustrates an example computing system 1100 configured according to an embodiment of the invention. As shown, the computing system 1100 includes, without limitation, a central processing unit (CPU) 1105, a network interface 1115, a bus 1117, a memory 1120, and storage 1130. The computing system 1100 also includes an I/O device interface 1110, connecting the computing system 1100 to I/O devices 1112 (e.g., keyboard, display and mouse devices). The computing system 1105 provides a computing system which allows a user to generating pixel velocity maps, for animating 2D line work and for generating 2D silhouettes for frames of rendered 3D geometry.

CPU 1105 retrieves and executes programming instructions stored in the memory 1120. Similarly, CPU 1105 stores and retrieves application data residing in the memory 1120. The bus 1117 is used to transmit programming instructions and application data between the CPU 1105, I/O devices interface 1110, storage 1130, network interface 1115, and memory 1120. CPU 1105 is included to be representative of a single CPU, multiple CPUs, a single CPU having multiple processing cores, and the like. And the memory 1120 is generally included to be representative of a random access memory. The storage 1130 may be a disk drive storage device. Although shown as a single unit, the storage 1130 may be a combination of fixed and/or removable storage devices, such as magnetic disc drives, solid state drives (SSD), removable memory cards, optical storage, network attached storage (NAS), or a storage area-network (SAN).

As noted above a computing system at an imaging studio may be configured to receive data from the multi-camera array as well as provide the operator interface 212, annotator interface 216, and artist interface 222 described above. However, the computing resources required to perform the reconstruction, registration and warping processes will likely exceed that required by the image capturing, editing, and customer facing systems. Accordingly, in one embodiment, a separate computing system (or systems) may be used to perform reconstruction, registration and warping process elements of the workflow described above. In such a case, the computing systems at the imaging studio 105 may transmit data to network or cloud based server system. For example, in one embodiment, the reconstruction, registration and warping processes may be provided to multiple imaging studios as a network service, allowing the computationally intensive processes to be performed on demand using scalable could-based computing resources. However, to facilitate this discussion, computing system 1100 is shown configured with exemplary software components configured to perform the imaging, reconstruction, registration, annotation, and editing and coloring processes described above.

Illustratively, the memory 520 includes an image capturing component 1121, a reconstruction component 1122, an annotation component 1123, a transform/warping component 1124, and an editing component 1125. As described above, the image capturing component 1121 provides a software application configured to receive and display a plurality of subject images 1126 captured using a multi-camera array, such as the multi camera array described in the '900 application. Once received, the subject images 1126 are passed to the reconstruction component 1122, which generates a highly detailed 3D mesh and texture of the individual captured in the subject images 1126—shown in FIG. 11 as reconstructed mesh/textures 1127.

The annotated component 1123 prompts a user to identify points in the reconstructed mesh 1127. As noted, the points are selected to have certain semantic importance relative to a figurine mesh 1132, such as landmark or feature points on a person's face. The feature points are used to transform the topology of the reconstructed mesh 1127 to match that of the figurine mesh 1132. Doing so results in a registered mesh and texture 1128 having a simplified topology (relative to the reconstructed mesh 1127) but the same geometry of the reconstructed mesh 1127. The editing component 1125 allows an operator to review the resulting registered mesh 1128 as well as blend a figurine texture map 1133 with the registered texture 1128. After any editing, the registered mesh/texture 1128 may be saved as a stored asset 1134.

Advantageously, as described, embodiments of the invention provide techniques for generating personalized digital assets, such as a figurine mesh and texture modeled on a princess figurine, but having a face modeled on a child. An initial 3D mesh representation of the person's face is simplified to match a topology of a desired figurine (e.g., the topology of a 3D model of a child's face is deformed to match a 3D mesh of the face of a princess figurine). However, while the topology is simplified to match that of the figurine, the 3D model retains the geometry of the child's face. Simplifying the topology of the 3D model in this manner allows the mesh to be more readily integrated with or attached to a mesh representing desired figurine. The resulting personalized digital asset may be used to create a variety of personalized products. For example, the digital asset can be supplied to a 3D printer and used to create a physically realized version of the 3D model, i.e., a princess doll with a shape and color generally matching the child's face. Other uses of this digital asset include creating images or renderings that can be applied to or incorporated with variety of products. Further, the digital asset can be used in creating other digital assets, e.g., rendering animation sequences. For example, the 3D model created using this process could be animated to appear dancing with another character from an animated feature.

While the foregoing is directed to embodiments of the present invention, other and further embodiments of the invention may be devised without departing from the basic scope thereof, and the scope thereof is determined by the claims that follow.

What is claimed is:

1. A method for processing three-dimensional (3D) graphics data, the method comprising:
   receiving a first polygonal mesh representing a humanoid face;
   determining a mapping from each of a plurality of vertices on the first polygonal mesh to a corresponding vertex on a second polygonal mesh;
   warping 3D geometry of the second polygonal mesh to correspond to a target geometry;
   simplifying a topology of the first polygonal mesh by reducing how many edges and vertices are used to represent the humanoid face;
   generating, from the mapping and the simplified topology of the first polygonal mesh, a third polygonal mesh having a topology of a subset of the second polygonal mesh and a 3D geometry of the humanoid face represented in the simplified topology of the first polygonal mesh; and
   attaching the third polygonal mesh to the second polygonal mesh by:
      removing, from the second polygonal mesh, the subset of the second polygonal mesh, and
      attaching vertices along a boundary of the third polygonal mesh to vertices along a boundary of the second polygonal mesh corresponding to the removed subset.

2. The method of claim 1, further comprising, warping the 3D geometry of the second polygonal mesh outside the subset of the topology of the second polygonal mesh to close a gap between the boundary of the third polygonal mesh and the boundary of the second polygonal mesh.

3. The method of claim 1, further comprising:
   transferring a texture map associated with the first polygonal mesh to the third polygonal mesh; and
   blending one or more regions of a texture map associated with the third polygonal mesh with portions of the texture map associated with the second polygonal mesh.

4. The method of claim 1, further comprising, generating a physically realized model of the second polygonal mesh.

5. The method of claim 1, further comprising, generating one or more two-dimensional 2D renderings of the second polygonal mesh.

6. The method of claim 1, wherein the first polygonal mesh is reconstructed from one of a plurality of images, a laser scan, and a plaster cast.

7. A computer-readable storage medium storing a program, which, when executed by a processor performs an operation for processing three-dimensional (3D) graphics data, the operation comprising:
   receiving a first polygonal mesh representing a humanoid face;
   determining a mapping from each of a plurality of vertices on the first polygonal mesh to a second polygonal mesh;
   warping 3D geometry of the second polygonal mesh to correspond to a target geometry;
   simplifying a topology of the first polygonal mesh by reducing how many edges and vertices are used to represent the humanoid face;
   generating, from the mapping and the simplified topology of the first polygonal mesh, a third polygonal mesh having a topology of a subset of the second polygonal mesh and a 3D geometry of the humanoid face represented in the simplified topology of the first polygonal mesh; and
   attaching the third polygonal mesh to the second polygonal mesh by:
      removing, from the second polygonal mesh, the subset of the second polygonal mesh, and
      attaching vertices along a boundary of the third polygonal mesh to vertices along a boundary of the second polygonal mesh corresponding to the removed subset.

8. The computer-readable storage medium of claim 7, wherein the operation further comprises, warping the 3D geometry of the second polygonal mesh outside the subset of the topology of the second polygonal mesh to close a gap between the boundary of the third polygonal mesh and the boundary of the second polygonal mesh.

9. The computer-readable storage medium of claim 7, wherein the operation further comprises:
    transferring a texture map associated with the first polygonal mesh to the third polygonal mesh; and
    blending one or more regions of a texture map associated with the third polygonal mesh with portions of the texture map associated with the second polygonal mesh.

10. The computer-readable storage medium of claim 7, wherein the operation further comprises, generating a physically realized model of the second polygonal mesh.

11. The computer-readable storage medium of claim 7, wherein the operation further comprises, generating one or more two-dimensional 2D renderings of the second polygonal mesh.

12. The computer-readable storage medium of claim 7, wherein the first polygonal mesh is reconstructed from one of a plurality of images, a laser scan, and a plaster cast.

13. A system, comprising:
    a processor; and
    a memory, wherein the memory includes an application program configured to perform an operation for processing three-dimensional (3D) graphics data, the operation comprising:
        receiving a first polygonal mesh representing a humanoid face,
        determining a mapping from each of a plurality of vertices on the first polygonal mesh to a corresponding vertex on a second polygonal mesh,
        warping 3D geometry of the second polygonal mesh to correspond to a target geometry,
        simplifying a topology of the first polygonal mesh by reducing how many edges and vertices are used to represent the humanoid face,
        generating, from the mapping and the simplified topology of the first polygonal mesh, a third polygonal mesh having a topology a subset of the second polygonal mesh and a 3D geometry of the humanoid face represented in the simplified topology of the first polygonal mesh, and
        attaching the third polygonal mesh to the second polygonal mesh by:
            removing, from the second polygonal mesh, the subset of the second polygonal mesh, and
            attaching vertices along a boundary of the third polygonal mesh to vertices along a boundary of the second polygonal mesh corresponding to the removed subset.

14. The system of claim 13, wherein the operation further comprises, warping the 3D geometry of the second polygonal mesh outside the subset of the topology of the second polygonal mesh to close a gap between the boundary of the third polygonal mesh and the boundary of the second polygonal mesh.

15. The system of claim 13, wherein the operation further comprises:
    transferring a texture map associated with the first polygonal mesh to the third polygonal mesh; and
    blending one or more regions of a texture map associated with the third polygonal mesh with portions of the texture map associated with the second polygonal mesh.

16. The system of claim 13, wherein the operation further comprises, generating a physically realized model of the second polygonal mesh.

17. The system of claim 13, wherein the operation further comprises, generating one or more two-dimensional 2D renderings of the second polygonal mesh.

18. The system of claim 13, wherein the first polygonal mesh is reconstructed from one of a plurality of images, a laser scan, and a plaster cast.

19. A figurine generated from a three-dimensional (3D) graphics data model generated according to a method, the method comprising:
    receiving a plurality of images of a human face;
    reconstructing, from the plurality of images, a first polygonal mesh representing the human face;
    determining a mapping from the first polygonal mesh to a second polygonal mesh;
    warping 3D geometry of the second polygonal mesh to correspond to a target geometry;
    simplifying a topology of the first polygonal mesh by reducing how many edges and vertices are used to represent the humanoid face;
    generating, from the mapping, a third polygonal mesh having a portion of topology corresponding to the second polygonal mesh, wherein a topology of the third polygonal mesh corresponding to the portion of the second polygonal mesh has the 3D geometry of the first polygonal mesh representing the human face;
    attaching the third polygonal mesh to the second polygonal mesh by:
        removing, from the second polygonal mesh, the subset of the second polygonal mesh, and
        attaching vertices along a boundary of the third polygonal mesh to vertices along a boundary of the second polygonal mesh corresponding to the removed subset; and
    printing, as the figurine, the of the second polygonal mesh using a 3D printer.

* * * * *